United States Patent [19]

Nakayama et al.

[11] Patent Number: 4,796,189

[45] Date of Patent: Jan. 3, 1989

[54] NAVIGATION SYSTEM FOR AUTOMOTIVE VEHICLE WITH AUTOMATIC NAVIGATION START AND NAVIGATION END POINT SEARCH AND AUTOMATIC ROUTE SELECTION

[75] Inventors: Okihiko Nakayama, Kamakura; Toshiyuki Itoh; Hiroshi Ueno, both of Yokosuka, all of Japan

[73] Assignee: Nissan Motor Company, Limited, Kanagawa, Japan

[21] Appl. No.: 842,365

[22] Filed: Mar. 19, 1986

[30] Foreign Application Priority Data

Mar. 20, 1985 [JP] Japan .................................. 60-57475

[51] Int. Cl.$^4$ ............................................. G06F 15/50
[52] U.S. Cl. ..................................... 364/449; 340/990; 340/995; 73/178 R; 364/444
[58] Field of Search ............... 364/443, 444, 449, 460, 364/521; 73/178 R; 342/450, 451; 340/988, 990, 995

[56] References Cited

U.S. PATENT DOCUMENTS

| | | | |
|---|---|---|---|
| 4,490,717 | 12/1984 | Saito | 340/995 |
| 4,511,973 | 4/1985 | Miura et al. | 340/990 |
| 4,535,335 | 8/1985 | Tagami et al. | 340/988 |
| 4,660,037 | 4/1987 | Nakamura | 340/990 |
| 4,663,629 | 5/1987 | Tagami et al. | 340/988 |

FOREIGN PATENT DOCUMENTS 0073618 3/1983 European Pat. Off. .
0126456 11/1984 European Pat. Off. .

Primary Examiner—Gary Chin
Attorney, Agent, or Firm—Lowe, Price, LeBlanc, Becker & Shur

[57] ABSTRACT

A navigation system has a map memory storing map data. The road map stored in the map memory is divided into a plurality of pages further subdivided into continuous blocks. The map memory also stores identification data for the blocks and index data for various points within the map blocks. The index data includes position data for a plurality of known points. The navigation system also includes an input unit for entry of the identification data for a map memory block and/or the index data for known points, and a display unit for displaying a map block on a display monitor. A processor of the navigation system accepts entry of the index data for a travel starting point and a destination through the input unit. Based on the entered data, the processor searches for the map blocks containing the designated known points. The processor progressively expands the search area along a vector between the travel starting point and the destination. The process finds the known point closest to the travel starting point and the other known point closest to the destination along the vector and stores these as the navigation start point and the navigation end point.

23 Claims, 15 Drawing Sheets

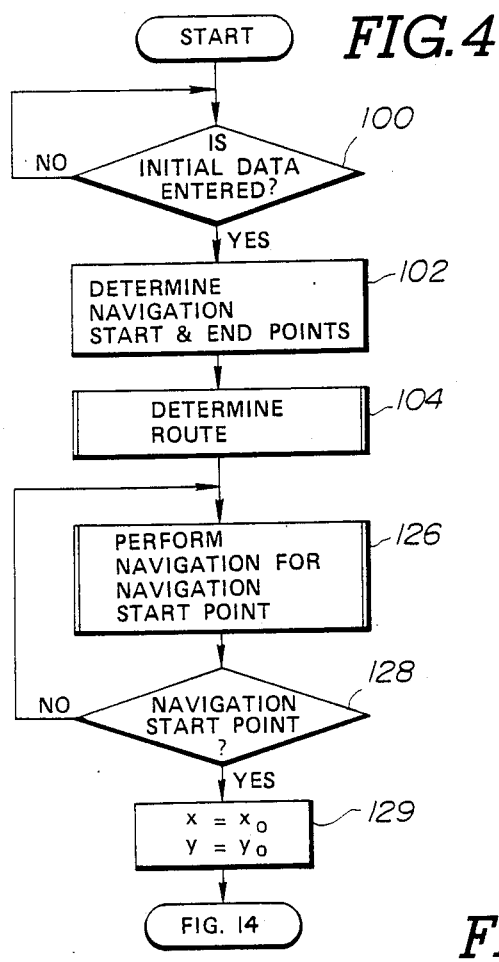
FIG. 4
FIG. 5
BLOCK A 345
- A-1  345-020
- A-2  345-021
- A-3  345-022
- A-4  345-277
BLOCK B346
- B-1  346-001
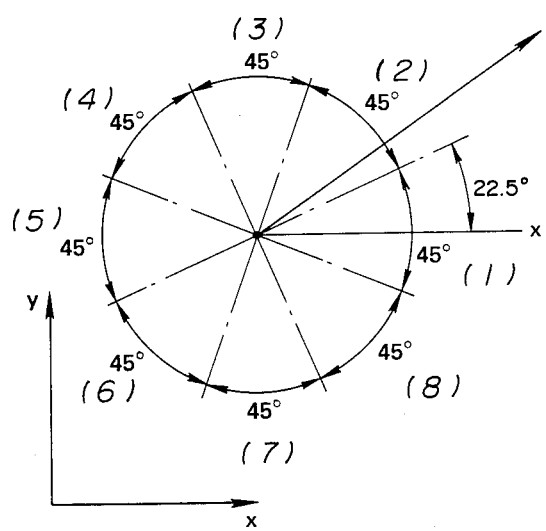
FIG. 6

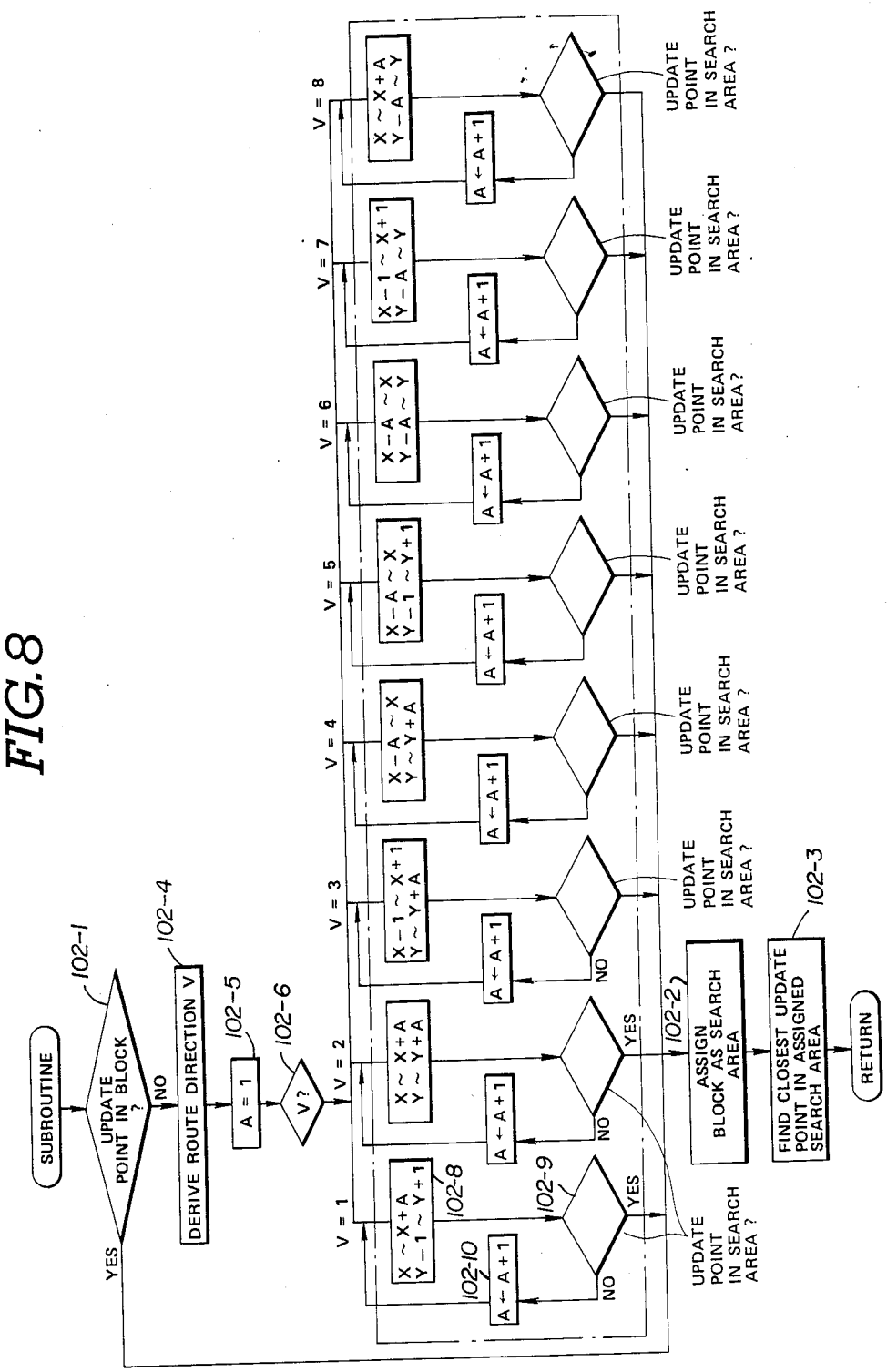

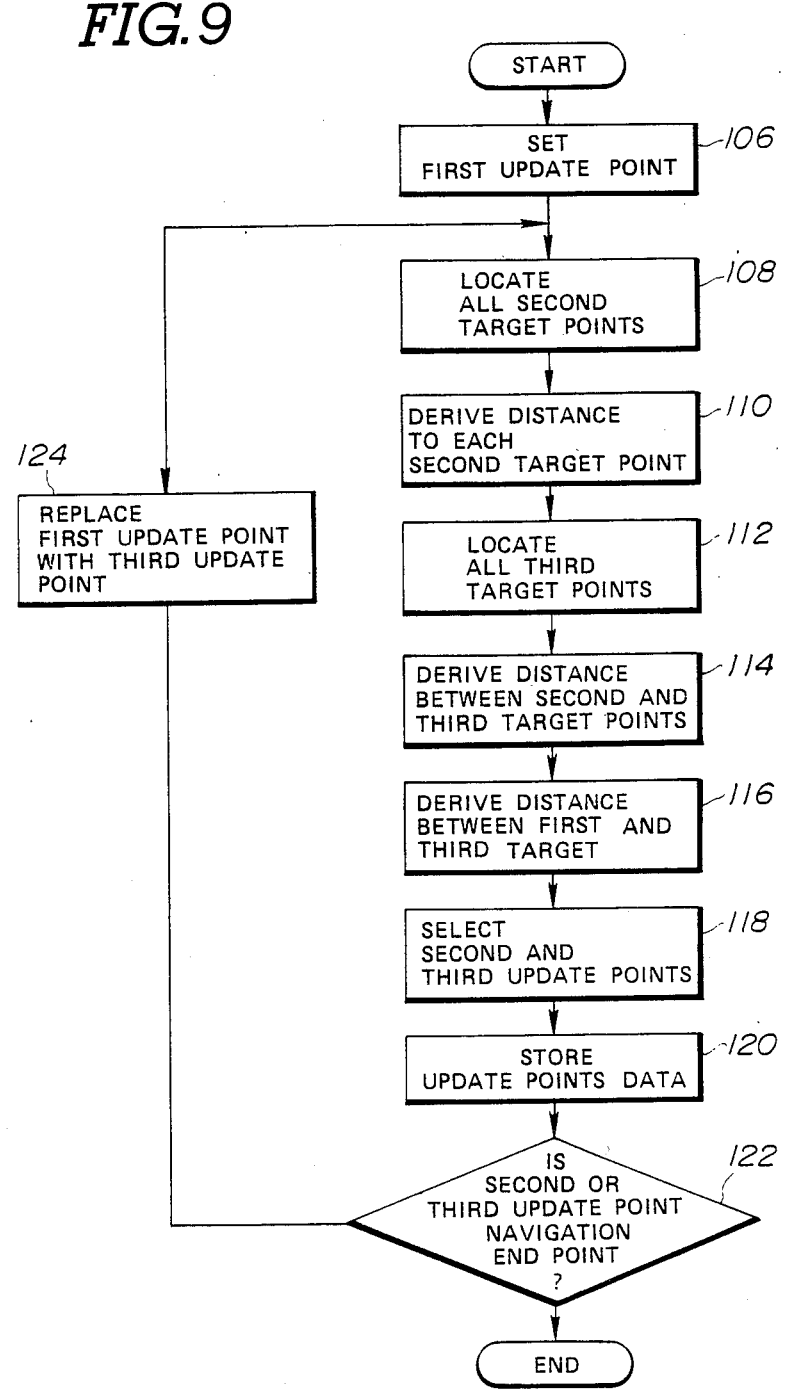

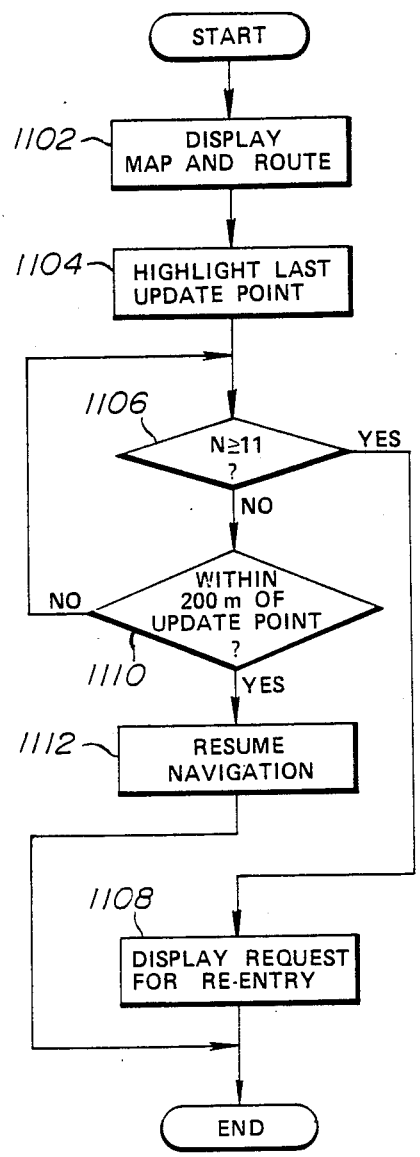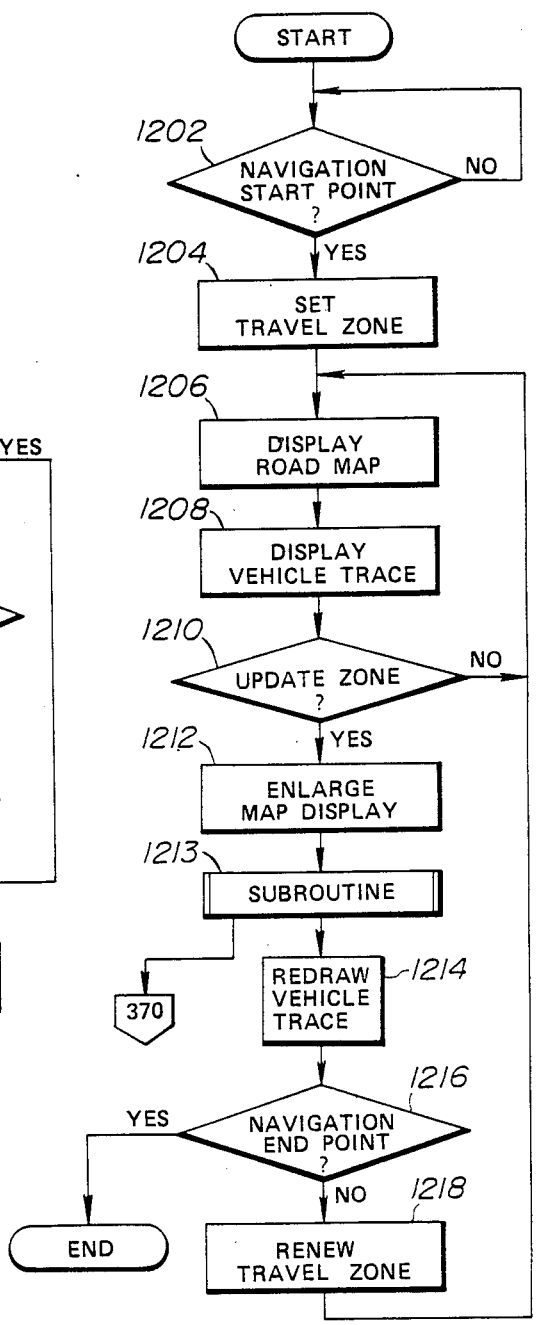

NAVIGATION SYSTEM FOR AUTOMOTIVE VEHICLE WITH AUTOMATIC NAVIGATION START AND NAVIGATION END POINT SEARCH AND AUTOMATIC ROUTE SELECTION

BACKGROUND OF THE INVENTION

The present invention relates generally to a navigation system including a road map display showing a road map and guiding the vehicle through a preset driving route. More specifically, the invention relates to a navigation system which automatically locates the navigation start and end points in response to entry of the vehicle position and destination position.

In recent years, various vehicular navigation systems for guiding vehicles through present travelling routes have been developed. Some navigation systems include a map display on a display monitor, such as a CRT display. In such systems, map data are stored in a high-capacity map memory, such as a CD ROM or the like. The map memory is generally divided into a plurality of pages representing separate, contiguous map areas. Each map area is further divided into a plurality of map blocks which generally correspond to one screen-ful on the display monitor. Each map area and/or map block includes an identification code or number.

Due to the relatively voluminous data stored in the map memory, it is sometimes difficult to access the appropriate map block including the vehicle starting point and the destination. Some systems allow automatic access to the appropriate map block by means of manual entry of the rough position of the starting point and the destination. Even in such cases, when a large number of map blocks are later isotropically searched for suitable route point, search time tends to be unacceptably long. On the other hand, when the scanning area is limited, it sometimes happens that the appropriate map block can not be found due to errors in the map data.

SUMMARY OF THE INVENTION

Therefore, it is an object of the present invention to provide a navigation system for an automotive vehicle, which can effectively and quickly locate the map block containing a desired point.

Another and more specific object of the present invention is to provide a navigation system which can quickly and automatically find map points corresponding to designated navigation start and end points.

In order to accomplish the aforementioned and other objects, a navigation system according to the present invention, has a map memory storing map data. The road map stored in the map memory is divided into a plurality of pages further subdivided into contiguous blocks. The map memory also stores idetification data for the blocks and index data for various points within the map blocks. The index data includes position data for a plurality of known points. The navigation system also includes an input unit for entry of the identification data for a map memory block and/or the index data for known points, and a display unit for displaying a map block on a display monitor. A processor of the navigation system accepts entry of the index data for a travel starting point and a destination through the input unit. Based on the entered data, the processor searches for the map blocks containing the designated known points. The processor progressively expands the search area along a vector between the travel starting point and the destination. The processor finds the known point closest to the travel starting point and the other known point closest to the destination along the vector and stores these as the navigation start point and the navigation end point.

According to one aspect of the invention, a navigation system for an automotive vehicle comprises first means for monitoring vehicle motion and deriving first data indicative of vehicle traveling data, second means for storing a map which is separated into a plurality of blocks and includes a plurality of known points, third means for entry of position data of at least a start point and a destination, fourth means allowing selection of a route for the vehicle and storing the selected routine, the fourth means storing second data indicative of a navigation start point, a navigation end point, designated known points along the route and between the navigation start point and the navigation end point, and a predetermined condition for detecting when the vehicle reaches each of the designated known points, the fourth means determining the navgiation start point and the navigation end point by searching the known points within a search area which is expandable in a limited direction determined based on a direction of a straight line extending through the start point and the destination, fifth means for displaying the map stored in the third means, and a symbol representing the vehicle position, and sixth means for setting a travel zone between successive designated known points and displaying instantaneous position of the vehicle, the sixth means monitoring vehicle position within the travel zone, detecting when the predetermined condition is satisfied and in such cases, and renewing the travel zone The fourth means determines the limited expanding direction of the search area by dividing a coordinate system into a plurality of sectors and selecting one of the sectors inclucing the direction along which the straight line lies. The fourth means expands the search area in step-by-step fashion whenever no known point is found in the search area.

Preferably, the sixth means detects the approach of the vehicle to the next designated known point on the basis of the first data, detects when the distance from the vehicle position to the next designated known point is less than a given distance, thus defining an area centered at the next designated known point, detects when the vehicle enters the defined area and checks the second data against a given direction so as to detect when the vehicle travel direction matches the given direction, thereby detecting when the predetermined condition is satisfied, and that the vehicle has reached the next designated known point.

In the alternative, the sixth means derives a distance of travel from a starting designated known point, detects the approach of the vehicle to the next designated known point on the basis of the first data, and detects when the distance from the vehicle position to the next designated known point is less than a given distance, thereby defining an area centered at the next designated known point, detects when the vehicle enters the defined area and compares the derived travel distance with the known distance between the designated known points, thereby detecting when the predetermined condition is satisfied, and thereby detecting that the vehicle has reached the next designated known point.

The fourth means stores data indicative of the vehicle travel direction while approaching the next designated known point and the vehicle travel direction leaving the next designated known point, and derives the direction data so as to represent a direction intermediate the stored directions. The first means replaces the first data indicative of the vehicle position with position data for the next designated known point when the sixth means detects that the vehicle has reached the next designated known point.

The first means replaces the first data with the position data of the next designated known point when the travel distance derived by the sixth means matches the known distance between the two designated points at least within the set area, in cases where the vehicle directions approaching and leaving the next designated known point are approximately equal.

In practice, the sixth means defines the defined area as a circular area of variable radius related to the error value when the approaching direction and leaving direction are different, and as an elongated area with its minor axis parallel to the vehicle travel direction, and its major axis perpendicular to the vehicle travel direction.

Alternatively, the first means replaces the first data with the position data of the next designated known point when the vehicle travel distance from the former designated known point is less than the known distance between the two designated known points when the vehicle exits the distal side of the elongated area.

According to another aspect of the invention, a navigation system for an automotive vehicle comprises a map memory storing a road map which is divided into a plurality of pages further subdivided into contiguous blocks, the map memory also storing idetification data for the blocks and index data for various points within the map blocks, which index data includes position data for a plurality of known points, an input unit for entry of the identification data for a map memory block and/or the index data for known points, a display unit for displaying a map block on a display screen, a processor accepting entry of the index data for a travel starting point and a destination through the input unit, searching for the map blocks containing the designated known points based on the entered data, the processor progressively expanding the search area along a vector between the travel starting point and the destination, the processor finding the known point closest to the travel starting point and the other known point closest to the destination along the vector and stores these as the navigation start point and the navigation end point, and the processor further determining a route between the navigation start point and the navigation end point.

According to a further aspect of the invention, a process for navigation of a vehicle along a preset route comprises the steps of:

providing a road map which is divided into a plurality of map blocks and including data for a plurality of known points on a map;

providing input data defining a start point and a destination;

displaying the road map on a visual display screen;

searching in a given search area for finding out the known points which are closest to the start point and destination for designation as a navigation start point and a navigation end point, the given search area originally corresponding to an area of each of the map blocks in which the start point and the destination exists and being progressively expanded toward a limited direction which is determined based on a direction between the start point and the destination;

presetting a route between the navigation start point and the navigation end point across the map and designating known points along the preset route;

defining a travel zone between a first starting designated known point and a second designated known point along the route;

monitoring vehicle travel distance with the travel zone and detecting when the vehicle approaches to within a first given area of the second designated known position;

displaying a symbol indicative of the instantaneous vehicle position through the travel zone;

monitoring vehicle behavior within the second given area for comparison with a predetermined criterion for detecting when the vehicle coincides with the second designated known point;

shifting vehicle position indicative symbol to the designated known point on the display; and redefining the travel zone by taking the second designated known point which currently coincides with the vehicle as the first designated known point and selecting a neighboring designated known point as the second designated known point.

In the preferred process, there is included a step of detecting when the vehicle coincides with the second given area by monitoring vehicle driving direction and comparing the vehicle driving direction with a known direction.

The known direction is derived from a known first vehicle travelling direction assumed by a vehicle approaching the second designated known point and a known second vehicle travelling direction assumed by a vehicle leaving the second designated known point. The known direction is the bisector of the angle subtended by the azimuth vectors of the first and second direction of travel.

In the preferred process, the vehicle coincidence with the second designated known point is detected by comparing the vehicle travel distance within the second distance area with the known distance between the first and second designated known points and detecting when the travel distance matches the known distance.

The position data of the vehicle is updated with the known position date of the second designated known point each time the travelling zone is redefined.

According to a yet further aspect of the invention, a method of finding a connectivity path, in a field of points of known position, between designated start and end points, comprises the steps of:

(a) tesselating the field into a plurality of blocks;

(b) sectoring the field about the start point;

(c) identifying a target sector in which lies a straight-line vector from the start point to the end point;

(d) defining a search area, initially enclosing only the block in which the start point lies;

(e) checking the search area for the presence of at least one of the points of known positions;

(f) if no points are found in step (e), expanding the search area to include blocks adjoining blocks already in the search area and lying at least in part within the target sector;

(g) repeating steps (e) and (f) until at least one point is found in step (e);

(h) defining the point found in step (e) as the start point;

(i) repeating steps (b) through (h) in the order listed until the end point is found in step (e).

Preferably, the foregoing step (h) further comprises the steps of finding which of the points found in step (e) lies closest to the start point, in cases where more than one point is found in step (e).

BRIEF DESCRIPTION OF THE DRAWINGS

In the drawings:

FIG. 4 is a flowchart for initialization of navigation in the preferred embodiment of the navigation system of FIG. 1;

FIG. 5 shows an example of a displayed map index;

FIG. 6 is an explanatory illustration showing a manner of derivation of search area by dividing the map coordinate system into a plurality of sectors;

FIG. 8 is a flowchart of a subroutine to be executed with the program of FIG. 4;

FIG. 9 is a flowchart of a sub-routine for selecting the vehicle travel route;

FIG. 22 is a flowchart of a program for guiding a vehicle back to a preset route triggered when the vehicle is detected to be off course;

FIG. 24 is a flowchart of another initialization process;

DETAILED DESCRIPTION OF PREFERRED EMBODIMENTS

Figure 1:
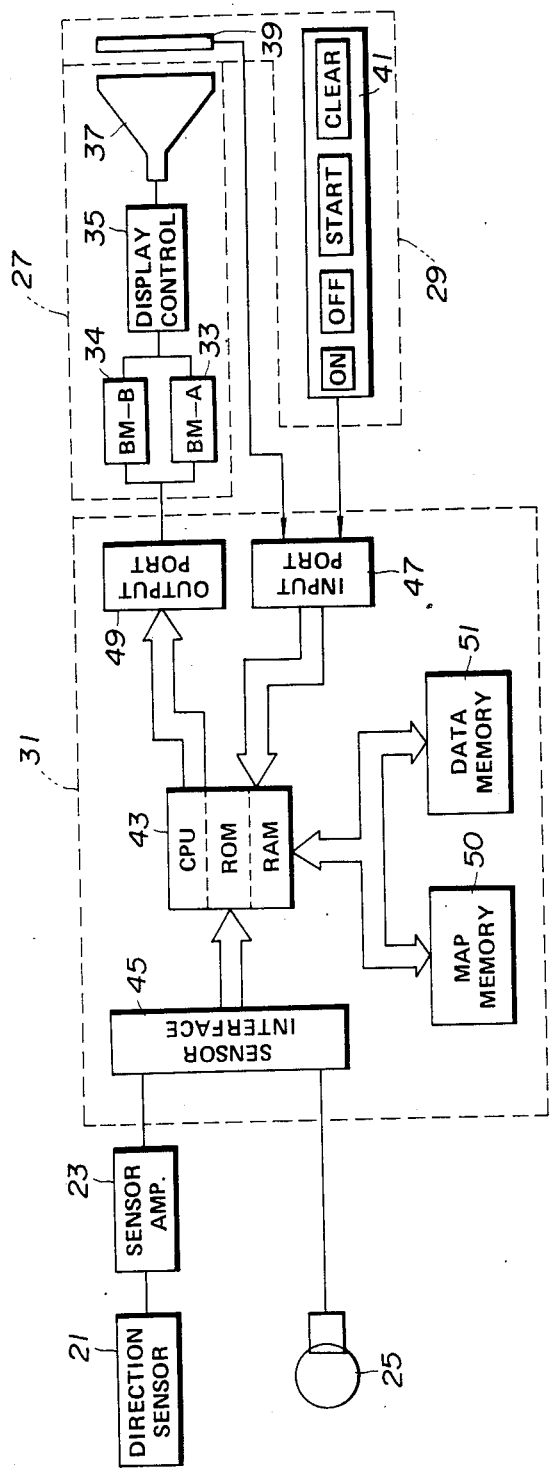
FIG. 1 is a block diagram of the preferred embodiment of the navigation system according to the present invention.
Figure 2:
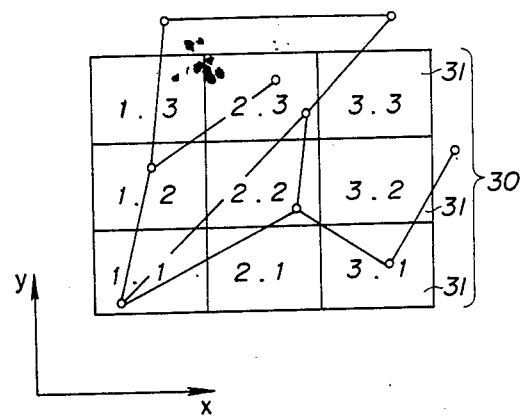
FIGS. 2 and 3(A) to 3(C) show the roadmap data format used in a map data storage unit shown in FIG. 1.
Figure 3:
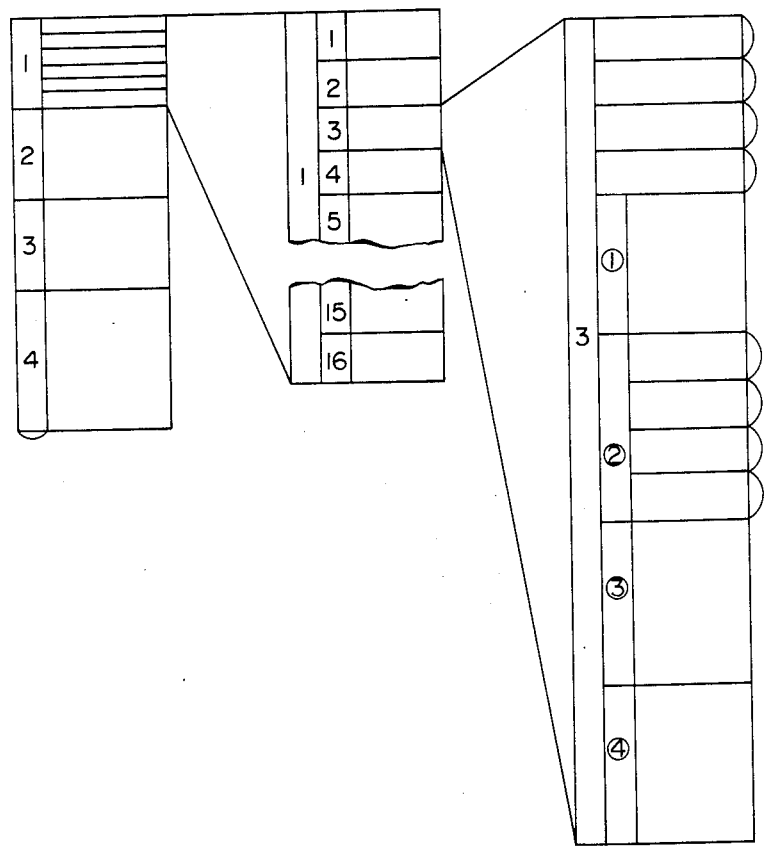

Referring now to the drawings, particularly to FIG. 1, the preferred embodiment of a navigation system according to the present invention will be disclosed in order to facilitate better understanding of the detailed description of the present invention.

It should be noted that the term "updating point" or "update point" used throughout the disclosure means preset target points of known position along a route to a given destination and the coordinates of which are stored in memory. Intersections, major curves and so forth may be selected for use as target points. Also, the term "travel zone" represents a zone or section in the preset route between update points. The first of the two update points defining the travel zone, i.e. the one from which the vehicle starts, will be referred to as "first update point". The other update point will be hereinafter referred to as "second update point". The update point or target point subsequent to the second update point will be hereafter referred to as "third update point" or "third target point". Furthermore, the term "update zone" represents an area or zone around the second update point defined for use in monitoring when vehicle passes the second update point.

FIG. 1 shows the preferred embodiment of the navigation system for implementing a method for detecting update points along a preset vehicle route.

The navigation system includes a vehicle direction of travel sensor 21 which may comprise a magnetic compass, for example. The preferred construction of the magnetic compass is as disclosed in SAE paper SP-80/458/SO2.05, published by the Society of Automotive Engineering, No. 800123 by H. Ito et al. or 3-axis Rate Gyro Package Parts No. PG24-N1, of Kabushiki Kaisha Hakushin Denki Seisakusho, February, 1979. Also, a suitable magnetic compass is disclosed in British Patent First Publication No. 2,102,259, published on Jan. 26, 1983, which corresponds to German Patent First Publication No. 32 17 880, published on Nov. 25, 1982, British Patent First Publication No. 2,100,001, published on Dec. 15, 1982, which corresponds to German Pat. First Publication No. 32 13 630, published on Nov. 18, 1982, and German Patent First Publication No. 33 05 054, published on Aug. 25, 1983. The contents of the above-identified publications are hereby incorporated for the sake of disclosure.

A travel distance sensor 25 monitors vehicular wheel rotation in order to monitor the distance travelled. The travel distance sensor 25 produces a travel distance indicative pulse with every predetermined number of wheel rotations.

The direction of travel sensor 21 is connected to a processing unit 31 via a sensor amplifier 23 which amplifies the direction of travel indicative sensor signal produced by the travel direction sensor, and a sensor interface 45 in the processing unit. The travel distance sensor 25 is also connected to the processing unit 31 via the sensor interface 45. The processing unit 31 has an output port 49 connected to a display unit 27 which includes buffer memories 33 and 34, a display controller 35 and a display device 37 which may be a CRT monitor, for example. The processing unit 31 also has an input port 47 connected to an input unit 29 including a key-switch array 41 and a transparent touch panel 39 which comprises a plurality of pressure responsive segments or thermo-responsive segments which accepts inputs by way of touching different points on the display screen. The touch panel 39 overlies the map displayed on the display screen to allow convenient input of position data. The function of the touch panel 39 can be imagined as being equivalent to the conventional light pen.

The processing unit 31 comprises a microprocessor made up of the aforementioned sensor interface 45, an input port 46, the output port 49, and in addition, built-in CPU, ROM and RAM units. A monolithic prcessing unit constructed as set forth above may serve as the microprocessor for ease of installation in the vehicular space. The processing unit 31 also includes a map memory 50 which stores map data for various locations. In order to store an adequately large volume of map data, the map memory 50 may be an external memory with a large-capacity storage medium, such as a read-only compact disk (CD). The processor unit 31 further includes a temporary data memory 51 for storing data concerning the preset route including position data, intersection configuration data and so forth for the preset update points.

The contents of the map memory is disclosed with reference to FIGS. 2 and 3(A) to 3(C). FIGS. 2 and 3(A) to 3(C) illustrate an example of the structure of the roadmap data stored in the roadmap data storage unit 18 shown in FIG. 1. For example, each regional roadmap such as Japan national, Hokkaido, Tohoku, Kanto, Central, Kansai, Chugoku, Shikoku, Kyushu, and so on is further divided into a plurality of individual regions. The roadmap information for each region is stepwise divided from upper divisions such as national roads (interstate freeways in the United States) to lower divisions such as regional roads (Prefectural roads and City roads).

The storage area within the storage unit 18 is divided into a plurality of blocks corresponding to regional areas 31 into which the map (FIG. 2) is subdivided. In addition, each block is subdivided into a plurality of intersection areas, each including information on configuration of the intersection, such as a T-type of cross-type, X-Y coordinate information for identifying the location of the intersection, the intersection name, and the intersection number, connecting road number, direction, and distance to all neighboring major intersections.

Practical operation of the preferred embodiment of the navigation system of FIG. 1 will be described in detail with reference to FIGS. 2 to 26.

The navigation system becomes active in response to closure of a power supply switch. After the power comes on, the system enters a stand-by state in which it awaits entry of data. Therefore, a step 100 checks for data entry, as shown in FIG. 4. In general, data entry is mediated by the key-switch array 1 of the input unit 29. The data to be entered includes the starting point and the destination. The preferred embodiment of the navigation system can accept the initial data for the starting position and the destination in either of two modes, referred to as "precise data entry" and "rough data entry". Both modes of data entry will be described hereinafter.

Precise Data Entry

Precise data entry may be performed by pointing the precise starting point and destination on the road map display. In this case, the map block or blocks in including the starting point and the destination are selected by entering identification codes thereof through the key-switch array 1 of the input unit 29. Upon entry of the identification code, the road map block in the map memory 50 is read out and displayed on the display screen. The starting point and the destination on the displayed map can be pointed out by means of the touch panel 39. The touch panel 39 produces a position signal representing x- and y-coordinates of the point touched on the displayed map. The position signal is decoded and stored as the coordinates of the starting point and the destination.

Rough Data Entry

Rough data entry does not require the exact position of the starting point and the destination to be pointed out. When rough data entry is desired, an index of individual unit areas of the road map are displayed on the display screen, in the manner shown in FIG. 5. As shown in FIG. 5, the index includes the names and codes of map divisions and the names and codes of individual unit areas included in the corresponding division. With reference to the displayed index, the identification code of the individual unit areas of the starting point and the destination are input through the key switch array 1 of the input unit.

The step 100 in the initialization program of FIG. 4 is repeated until all the above data entry has been performed. Thereafter, target points to be taken as navigation start and end points are determined, at a step 102. The navigation start and end points are determined by executing a sub-routine of FIG. 8, which will be described later.

Figure 7A:
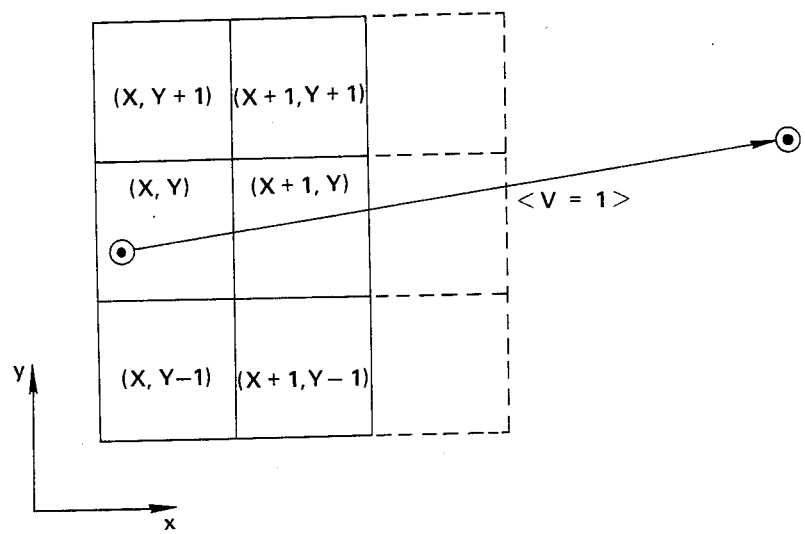
FIGS. 7(A) and 7(B) are explanatory illustration showing structure of the road map and manner of expanding of the search area according to the present invention.

In general, the navigation starting point and the navigation end point are selected from among target points located nearest the starting point and the destination. In order to select the target points serving as the navigation start point and the navigation end point quickly and effectively, the map coordinate system is divided into a plurality of equi-angular sectors, e.g. into 8 sectors. The area of search for the update points to be used as the navigation start point and the navigation end point will be limited to the sector which includes a line between the starting point and the destination. In the shown embodiment, the map coordinate system is divided into 8 sections (V=1 to V=8), as shown in FIG. 6. Therefore, as shown in FIG. 7(A), assuming the vehicle starting point $Z_s(x_s, y_s)$ is in the map block identified by map block identification (X, Y) and that the destination $Z_D$ $(x_D, y_D)$ is located in a direction lying within the sector (V=1) in FIG. 6, the search for the navigation start point starts within the map block (X, Y). If at least one target point is found in the map block (X, Y), all the remaining target points in the corresponding map block (X, Y) by setting the map block as the search area. On the other hand, if no target point are found in the map block (X, Y), the search area is expanded to some of the adjoining map blocks. As will be seen from FIG. 7(A), the map blocks (X, Y+1), (X+1, Y+1), (X+1, Y), (X+1, Y−1) and (X, Y−1) adjoin the map block (X, Y) in the general direction of the destination. These map blocks within the sector (V=1) are then selected so as to expand the search area. Therefore, in the next time, the search for the target point to be assigned for use as the navigation start point is conducted over these six map blocks. As above, if no target points are found in the expanded search area, the area is again expanded along the x-axis (in the case of V=1), and this is repeated until a target point is found. If more than one target point is located, the closest one to the starting point is selected as the navigation start point.

Figure 7B:
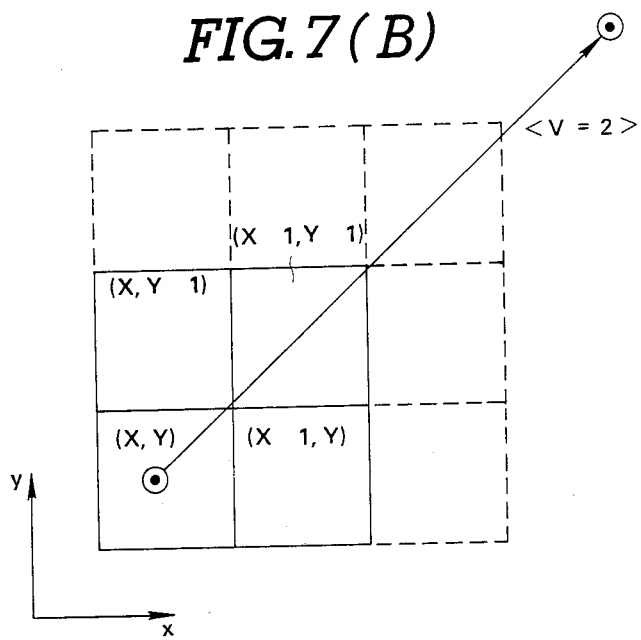

Similarly, in the case where the direction to the destination $Z_D$ from the starting point $Z_S$ lies within the sector (V=2), the search area is expanded along both x- and y-axes, as shown in FIG. 7(B), so that the search area takes the form of a square quadrant.

The coordinates of the navigation start and end points are stored for later use. After completing the process in the step 102, a sub-routine for determining the travel route is performed at a step 104. The sub-routine is shown in FIG. 9. In the sub-routine of FIG. 9, all of the target points to be used as updating points are determined one-by-one so as to find the shortest possible route.

FIG. 8 shows a flowchart of a subroutine at the step 102 in the program of FIG. 4. At a step 102-1, checking is performed whether at least one target point to be an update point is exists in a map block in which the starting point or the destination exists. If at least one update point is found in the corresponding block as checked at the step 102-1, then the block is assigned as a search area at a step 102-2. Thereafter, all of the update points in the search area are searched at a step 102-3. At the same step 102-3, the update points closest to the starting point and the destination are selected to assign as the navigation start point and the navigation end point.

On the other hand, when no update point is found in the block wherein the starting point and the destination exist, the process goes to a step 102-4 to derive a route direction based on the position of the starting point and the destination. A map identification value A is set to 1 at a step 102-5. Thereafter, the route direction is checked against the sectors V=1 to V=8 of FIG. 6, at a step 102-6. Then, the process at the step 102-7, one of the series of operation is performed for controlling expansion of the search area and for finding out update point or update points within the search area. For instance. assuming the route direction is involved in the sector V=1 as checked at a step 102-6, then search area is expanded over the map blocks (X, Y+1), (X+1, Y+1), (X+1, Y), (X+1, Y−1) and (X, Y−1) adjoining the map block (X, Y) at a sub-step 102-8. Then, at a step 102-9, checking is performed whether at least one target point to be an update point exists in the search area. If at least one update point is found in the corresponding block as checked at the step 102-9, then the process goes to the step 102-2. Similarly to the foregoing, in the step 102-2, the blocks (X, Y+1), (X+1, Y+1), (X+1, Y), (X+1, Y−1) are assigned as a search area. Thereafter, all of the update points in the search area are searched at a step 102-3. At the same step 102-3, the update point closest to the starting point and the destination are selected to assign as the navigation start point and the navigation end point.

If an update point cannot be found even after expansion of the search area, the map block identification value A is incremented by 1 at sub-step 102-10. Then, at the sub-step 102-8, the search area is again expanded.

By such procedure, expansion of the search area for finding the update point or points can be performed in a substantially limited area around the route direction. This saves search time for effectively determining the navigation start point and the navigation end point.

At the first cycle of sub-routine execution, the navigation start point determined at the step 102 is taken as the first update point at a step 106, shown in FIG. 9. Then, all of the adjoining target points around the first update point are found and checked at a step 108. Based on the known positions of these target points, the distance to each target point is calculated at a step 110. The resultant distance values are temporarily stored. After this, the target points adjoining each of the second target points uncovered in the step 108 are located at a step 112. The distances between the second and these third target points are calculated at a step 114. Thereafter, the distances between the first update and the third target points are calculated at a step 116. The smallest of the resultant distance values obtained at the step 116 is selected so that the target points along the shortest route are selected as the second and third update points, at a step 118. The position data of the determined second and third update points are stored in the data memory 51 at a step 120. Then, the second and third update points determined in the preceding steps are checked against the navigation end point to see whether either of the second or third update point determined at the step 118 is the navigation end point. If NO, process control passes to a step 124 in which the third update point is taken as the first update point for the next cycle of execution of the steps 108 to 122. On the other hand, if one of the second and third update points is the navigation end point, control returns to the routine of FIG. 4.

Therefore, by repeating the steps 108 to 124, all of the update points along the route are found and recorded in the data memory 51.

Figure 12:
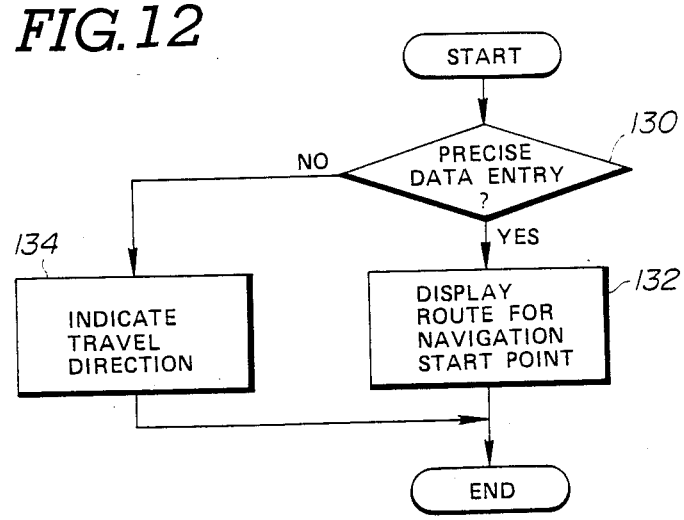
FIG. 12 is a flowchart of the process of navigation to the navigation start point.

After completing the sub-routine of FIG. 9, navigational guidance to the navigation start point is provided by the sub-routine illustrated in FIG. 12. During vehicle travel, travel distance $\int \Delta D$ and instantaneous vehicle position are derived and updated periodically. In practice, the travel distance and the instantaneous vehicle position are updated after every given distance of vehicle travel. As stated previously, the vehicle travel distance is monitored by the travel distance sensor 25 which produces the travel distance indicative pulse per given unit distance of travel of the vehicle. Therefore, by counting the vehicle travel distance indicative pulses from the travel distance sensor 25, the travel distance can be monitored. The vehicle travel distance $\int \Delta D$ and the instantaneous vehicle position (x, y) are derived by an interrupt routine shown in FIG. 13. As will be appreciated, the interrupt routine of FIG. 13 is triggered at every given distance $\Delta D$ of vehicle travel.

Figure 13:
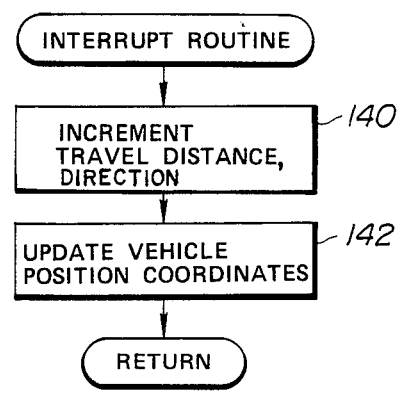
FIG. 13 is a flowchart of an interrupt routine for deriving vehicle travel distance and instantaneous vehicle position.

In the interrupt routine of FIG. 13, the travel distance $\int \Delta D$ is updated by adding $\Delta D$ to the existing value, at a step 140, and the direction of vehicle travel $\theta$ over the last unit of distance $\Delta D$ is read out. Then the distances travelled along the coordinate axes $\Delta x$ and $\Delta y$ from the first update point are updated according to the following equations:

$$\Delta x \rightarrow \Delta x + \Delta D \cos \theta$$

$$\Delta y \rightarrow \Delta y + \Delta D \sin \theta$$

The instantaneous vehicle position (x, y) is then derived from the following equations:

$$x = x_1 + \Delta x$$

$$y = y_1 + \Delta y$$

where $x_1$ and $y_1$ represent the coordinates of the first update point from which the vehicle travels to the second update point.

In the step 142, the vehicle symbol is moved to the point (x, y). Control then returns to the navigation program.

Figure 10:
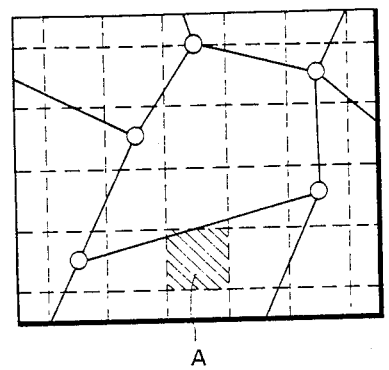
FIGS. 10 and 11 are exemplary displays for guiding the vehicle to the navigation start point.
Figure 11:
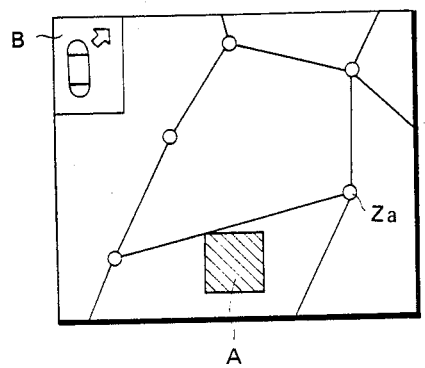

The sub-routine of FIG. 12 first checks whether input of the starting point was performed in precise data entry mode or the rough data entry mode, at a step 130. If the starting point was selected by means of the precise data entry mode, then normal navigation process starts. Thus, at a step 132, the appropriate block of the road map and the selected route are displayed on the display screen 37. On the other hand, if the starting point was selected by rough data entry, a larger-scale road map including the initial individual unit area is displayed on the display screen at a step 132 as shown in FIG. 10. Then, a directional guidance inset B is displayed in one corner of the display screen at a step 134. An arrow points in the suggested direction of travel to the navigation start point $Z_a$, as shown in FIG. 11.

After the step 132 or 134, control returns to the routine of FIG. 4. Immediately after returning from the sub-routine of FIG. 12, the vehicle position is checked to see if the vehicle has reached the navigation start point or not at a step 128 of FIG. 4. If the vehicle has not yet reached the navigation start point, control returns to the step 126 to re-execute the sub-routine of FIG. 12. On the other hand, once the vehicle reaches the navigation start point, the vehicle position coordinates are set equal to those of the navigation start point $(x_0, y_0)$ and a first travel zone is set up using the navigation start point as the first update point, at a step 129.

Figure 14:
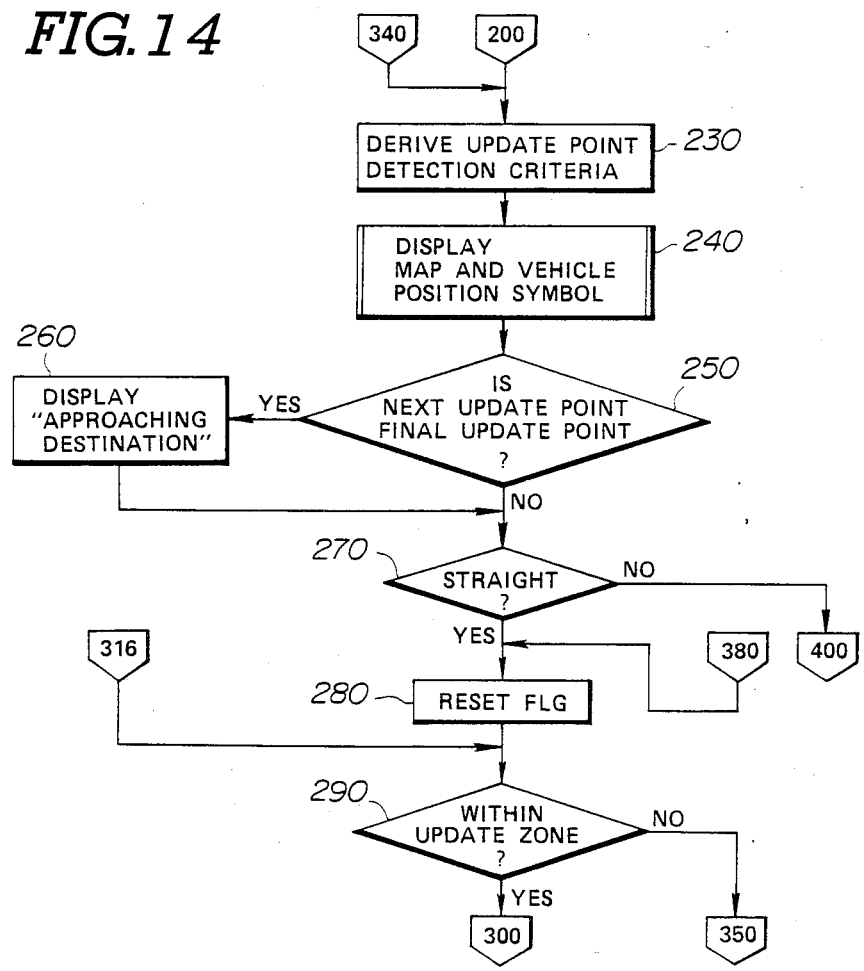
FIG. 14 is a flowchart of a program to be executed subsequently to the program of FIG. 4.
Figure 15:
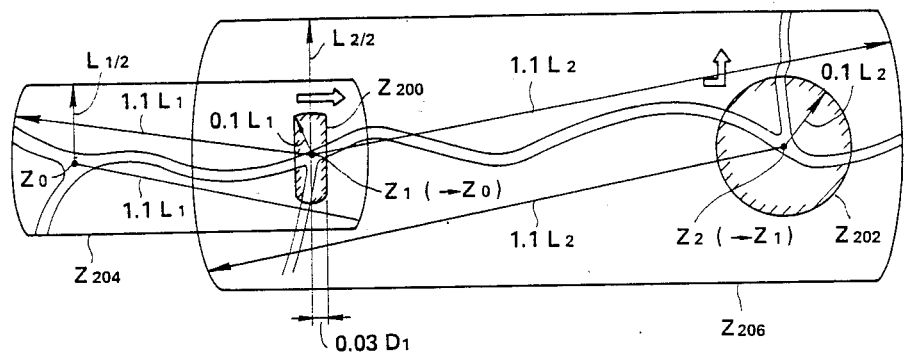
FIG. 15 is a diagram of update zones.
Figure 16:
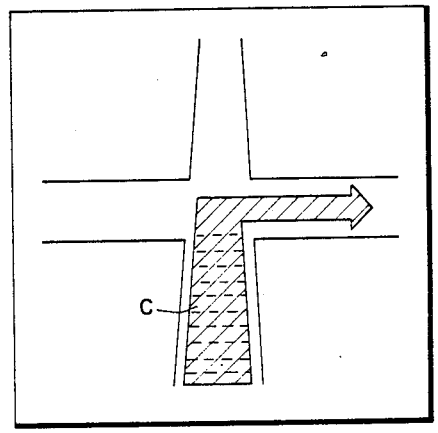
FIGS. 16 and 17 are exemplary displays during vehicle travel within an update zone.
Figure 17:
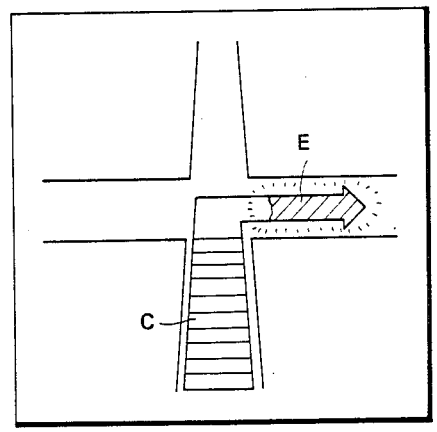

At subsequent step 230 in FIG. 14, an update zone which extends a given distance from the second update point $(x_1, y_1)$ is also derived, in a manner shown in FIG. 15. As shown in FIG. 15, the configuration of the update zone varies with the relationship between the entry direction $\theta_{in}$ and the exit direction $\theta_{out}$. For instance, when the preset route through the second update point is straight, the update zone around the second update zone is essentially an elongated rectangle with its major axis perpendicular to the axis of the preset route at the second update point, as represented by the reference numeral $Z_{200}$. On the other hand, when the preset route requires a turn or a change in travel direction at the second update point, the update zone will be a circle centered on the second update point, as represented by the reference numeral $Z_{202}$. The configuration of the update zone also varies with the distance D between the first and second update points.

The configuration of the rectangular update zone is defined by the intersection of a circle and an elongated rectangle, both centered on the second update point $(x_1, y_1)$. The radius of the circle about the second update point is 0.1D. The minor axis of the rectangle is 0.06D centered on the second update point and its major axis is longer than the radius of the circle. This figure is actually the geometric result of two criteria for recognizing that the vehicle position approximately coincides with the second update point, namely, (1) that the current detected vehicle position is within 0.1D of the second update point; and, (2) that the total travel distance $\int \Delta D$ is within ±0.03D of the known distance between update points in question. Note that the relatively high accuracy of the travel distance is reflected in the 0.03D value and the relatively low directional accuracy is reflected in the 0.1D value.

On the other hand, if the update zone is of the circular form, the radius thereof is 0.1D about the second update point $(x_1, y_1)$.

An error zone $Z_{204}$ or $Z_{206}$ is also set up in step 230. The error zone is in the form of a rectangle extending from the first update point or the starting point to the next update point. In addition, the longitudinal ends of the rectangle are defined by circles of radius 1.1D centered on the two update points. The rectangle is 0.5D wide, so that the error zone covers a corridor 0.25D to either side of the line connecting the update points and extending about 0.1D past both update points. Note that this area covers the update zone completely. Furthermore, the route followed by the vehicle cannot deviate by more than 0.25D from the straight-line path- this imposes a need for extra preset update points on especially circuitous roads.

At a step 240, the map and the vehicle position symbol are displayed on the display screen 37 so as to renew the display for the next update point. Then, at a step 250, the program checks to see whether or not the next update point is the one closest to the destination. The update point closest to the destination will be referred to as the "final update point". If the next update point is the final update point, a message "APPROACHING DESTINATION" is displayed on the display screen 37. In either case, at a step 270, the preset route is checked to see of the vehicle is to pass straight through the update point rather than turning.

If the vehicle is to pass straight through the update point, a flat FLG is reset at a step 280. Otherwise control passes to a step 400 which will be discussed later. After the flag FLG is reset at the step 280, the program checks to see if the vehicle is in the update zone, at a step 290. If the vehicle is in the update zone, control passes to a step 300; otherwise the program goes to a step 350.

Figure 18:
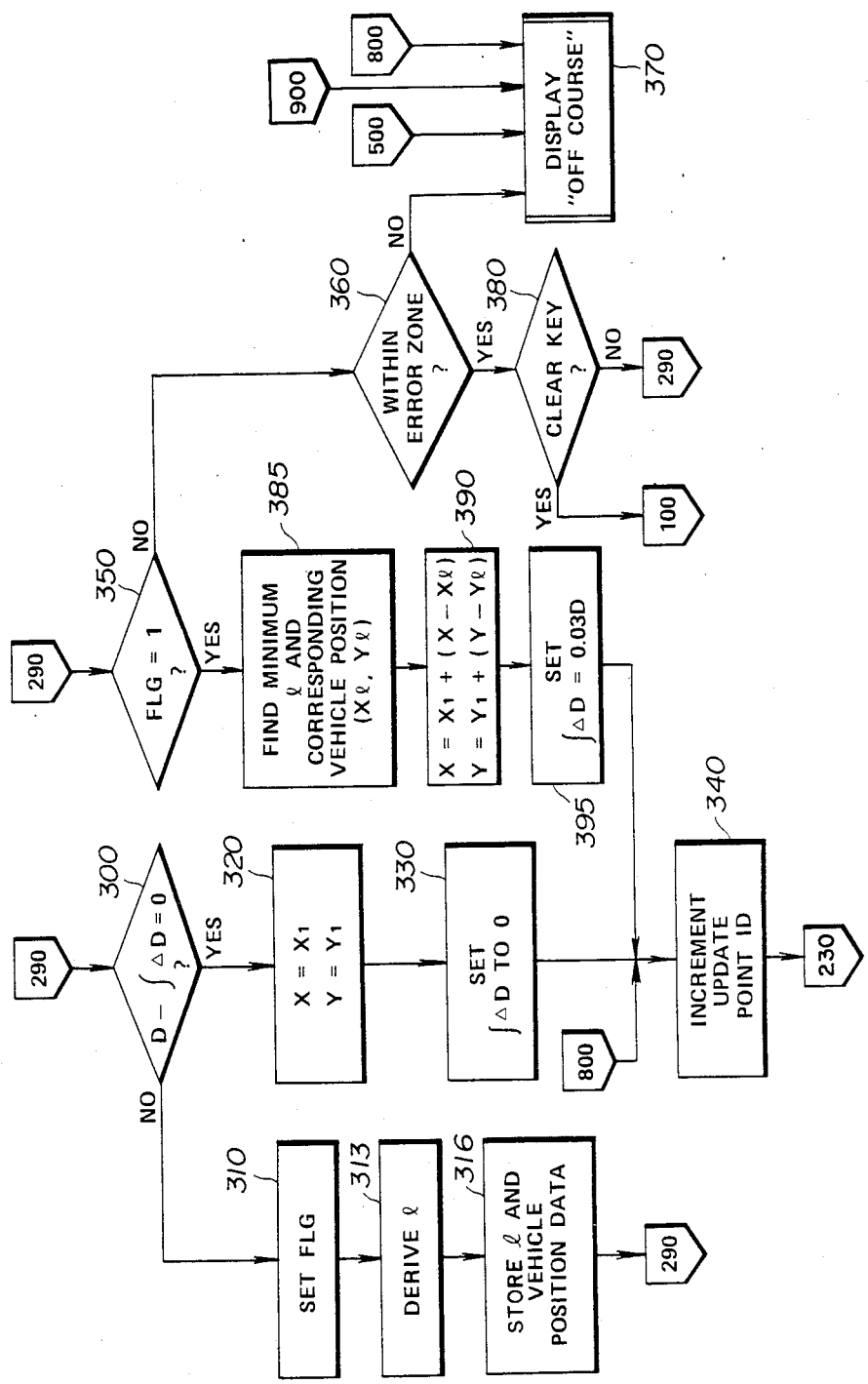
FIG. 18 is a flowchart of a program executed after the program of FIG. 14.

At the step 300 in FIG. 18, the distance $\int \Delta D$ travelled since the last update point is compared with the known distance D between the two updating points. If the measured distance $\int \Delta D$ matches the known distance D, when checked at the step 300, control passes to a step 320 in which the vehicle position coordinates (x, y) are replaced by the coordinates $(x_1, y_1)$ of the current update point. Thereafter, at a step 330, the travel distance $\int \Delta D$ between the update points is rest to zero. Then, data identifying the current pair of update points is updated so as to point to the next stretch of the preset route at a step 340. Thereafter, control returns to the step 230.

On the other hand, if the difference between the measured distance $\int \Delta D$ and the known distance D is other than zero at step 300, the flag FLG is set at a step 310. The distance l between the update point $(x_1, y_1)$ and the instantaneous vehicle position (x, y) is derived according to the following formula, at a step 313:

$$l = (x-x_1)^2 + (y-y_1)^2$$

At a step 316, the calculated distance l and the instantaneous vehicle position coordinates (x, y) are stored for later reference. Then control returns to the step 290. The steps 290, 300, 310, 313 and 316 are repeated until the vehicle leaves the update zone or the difference between the calculated distance $\int \Delta D$ and the known distance D reaches zero when checked at the step 300, i.e. until the vehicle reaches the update point.

If the vehicle is outside of the update zone at step 290 then the flag FLG is checked at a step 350. If the flag FLG is set, the stored data indicative of the distance l are checked to find the minimum value, i.e. the closest approach to the update point, at a step 385. At the step 385, the coordinates $(x_l, y_l)$ of the vehicle position at which the minimum distance l is obtained are read out. At steps 390 and 395, the vehicle position coordinates are adjusted to approximate the correct position. This adjustment is based on the assumptions that the closest approach $(x_l, y_l)$ was in fact the update point $(x_1, y_1)$ and that the vehicle is now 0.03D past the update point. The new coordinates are given by the following equations:

$$X = X_1 + (X - X_i)$$

$$Y = Y_1 + (Y - Y_i).$$

The travel distance value $\int \Delta D$ is set to 0.03D as an initial value in step 395, and then control passes to the step 340.

If the flag FLG is not set when checked at the step 350, the program checks to see whether the vehicle is in the rror zone, at a step 360. If NO, i.e., if the vehicle is outside of the error zone, the message "OFF COURSE" is displayed on the display screen, at a step 370 and the program ends. On the other hand, if the vehicle is still within the error zone, the program checks the CLEAR key in the switch-key array 41, at a step 380. If the CLEAR key has been depressed at the step 380, control returns to the initializing step 100. Otherwise, control passes to the step 290.

Figure 19:
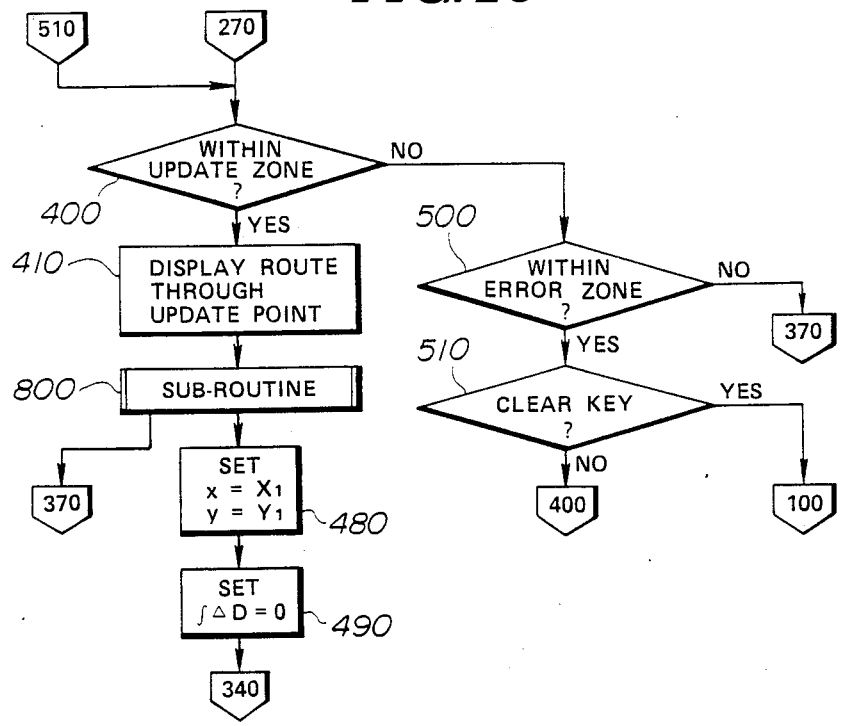
FIG. 19 is a flowchart of a program to be executed after the program of FIG. 18.
Figure 23:
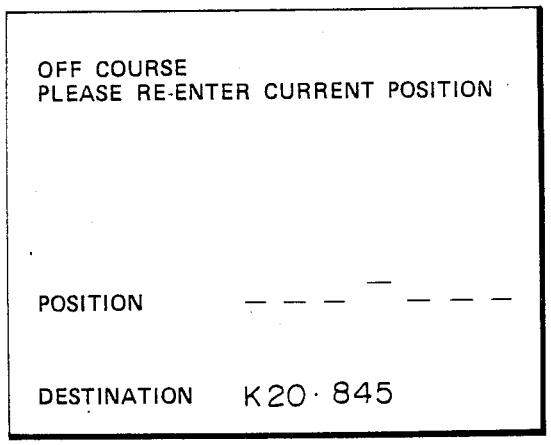
FIG. 23 is an illustration of a display generated at a step 1108 of FIG. 22.

If the vehicle is to change direction significantly (step 270), control passes to a step 400 at FIG. 19, which checks to see if the vehicle is in the update zone. If so, at step 410 the planned route through the current update point is displayed graphically on the screen to aid the driver at this crucial point. The display image generated at the step 410 includes a number of indicator segments, each indicative of a given distance of vehicle travel arranged along the route in both entry and exit directions. After the step 410, one of the sub-routines as shown in FIGS. 20 and 21 is executed.

On the other hand, if the vehicle is not within the update zone when checked at the step 400, then the vehicle position is again checked to see if it is still within the error zone, at a step 500.

If the vehicle is outside of the error zone when checked at the step 500, the message "OFF COURSE" is displayed on the screen at the step 370. On the other hand, if the vehicle is within the error zone when checked at the step 500, then the program checks whether the CLEAR key has been depressed or not, at a step 510. If the CLEAR key has been depressed, then control returns to the initialization step 100; otherwise control returns to the step 400.

Figure 20:
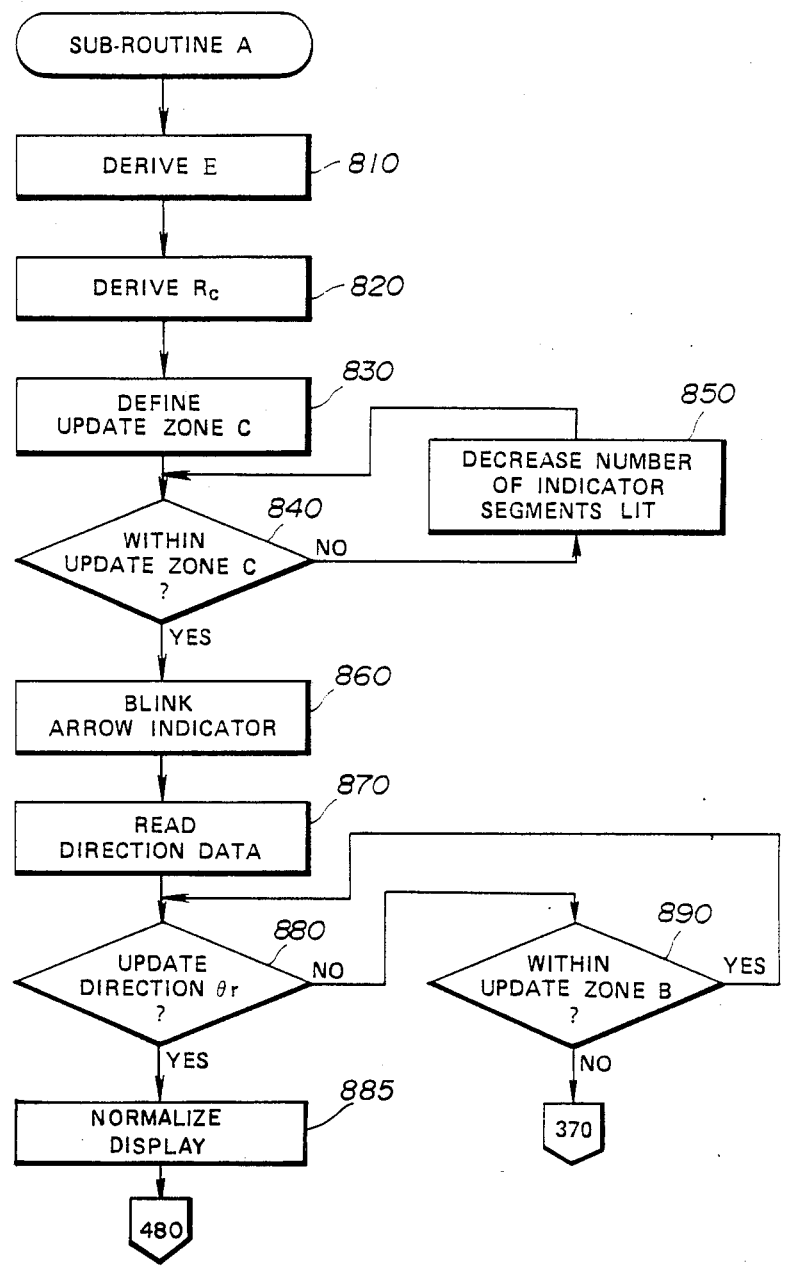
FIG. 20 is a flowchart of a sub-routine of the program of FIG. 19.
Figure 21:
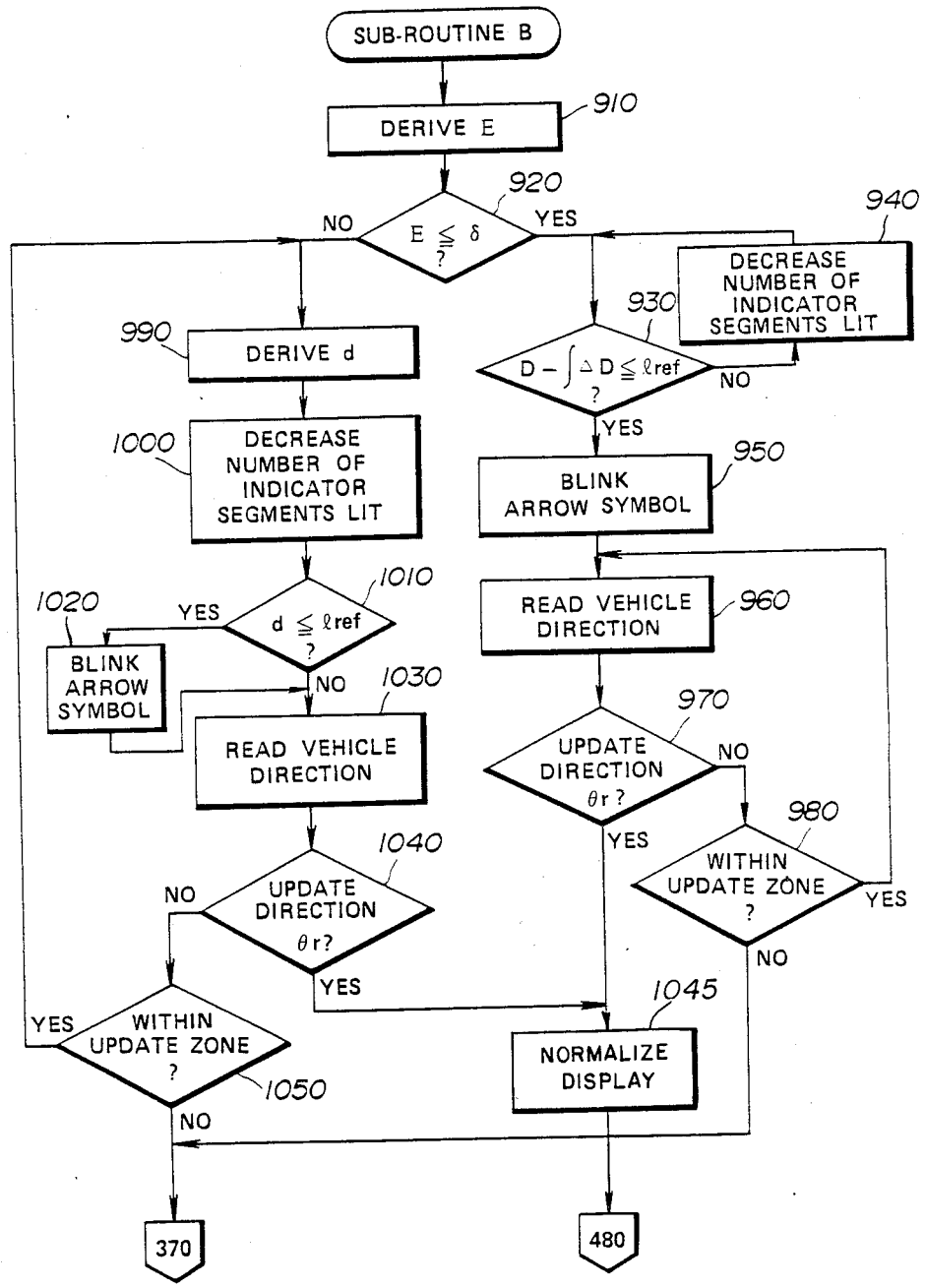
FIG. 21 is a flowchart of a modified sub-routine to be executed in the program of FIG. 20.

The sub-routine of FIG. 20 is triggered when the vehicle enters the circular update zone B. At a step 810, the difference between the measured travel distance $\int \Delta D$ and the known distance D between the update points is derived. The obtained difference is subtracted from the radius 0.1D of the circular update zone, and the absolute value of this result is divided by the known distance value D to derive an error rate value $\epsilon$. This error rate $\epsilon$ is representative of the error between the known distance and the measured distance due possibly to errors in either the map data or in the measurement of the travel distance by the distance sensor 25. A small error rate means that the measured travel distance $\int \Delta D$ will tend to match the known distance D. On the other hand, a large error rate means that the travel distance value $\int \Delta D$ will differ significantly from the known distance.

As the error rate increses, the update zone, within which the vehicle driving direction is monitored and compared with the update direction in order to detect when the vehicle reaches the updating point, must widen so as to allow for greater error. Accordingly, a circular update zone C of variable radius is set up at a step 820. The radius of the update zone C is derived from the following formula:

$$R_c = \gamma \times \delta \times D$$

Therefore, when the error rate $\delta$ is small, the radius $R_c$ of the update zone C will also be small. On the other hand, when the error rate $\delta$ is large, so is the radius $R_c$ of the update zone C. The minimum and maximum radii of the update zone C are limited respectively to 100 m and 0.1D which corresponds to the radius of the fixed radius update zone set up in step 230. Using the radius $R_c$ determined at the step 820, the update zone C is defined to be centered on the update point $(x_1, y_1)$, at a step 830. After this, the vehicle position $(x, y)$ is checked at a step 840 to see if the vehicle is within the update zone C.

If the vehicle is outside of the update zone C when checked at the step 840, then distance indicator segments on the display screen 37 are turned OFF one-by-one at given intervals of vehicle travel at a step 850.

On the other hand, if the vehicle is in the update zone C when checked at the step 840, then arrow symbols uded as the distance indicator segments mentioned above start to blink at a step 860. Thereafter, the vehicle driving direction is read out at a step 870. The read vehicle direction of travel is compared with the update direction at a step 880. If the vehicle direction of travel does not match the update direction, the program then checks to see if the vehicle is within the fixed-radius update zone at a step 890. If the vehicle is still within the fixed-radius update zone B, control returns to the step 880; otherwise, control returns to the step 370 set forth above.

Once the vehicle travel direction matches the update direction when checked at the step 880, the display on the display screen 37 is normalized at a step 885. Thereafter, the vehicle position data $(x_0, y_0)$ are replaced by the position data $(x_1, y_1)$ of the update point the vehicle just reached, at a step 480 of FIG. 19. Thereafter, the travel distance $\int \Delta D$ is reset to zero, at a step 490. Then, control returns to the step 340 of FIG. 18 to repeat the navigation process for the next preset update point.

FIG. 21 shows a modification to the sub-routine of FIG. 20. As in the sub-routine of FIG. 4, the error rate $\epsilon$ is derived at a step 910. The derived error rate $\epsilon$ is compared with a reference value $\delta$ at a step 920. If the error rate $\epsilon$ is equal to or less than the reference value $\delta$, the program goes to a step 930, in which the difference between the travel distance $\int \Delta D$ and the known distance D between the update points is compared with a predetermined distance value $l_{ref}$ at a step 930. If the difference $(D - \int \Delta D)$ is greater than the predetermined distance value $l_{ref}$, then the distance indicator segments are turned OFF one-by-one per unit of distance travelled by the vehicle in a step 940.

If the difference $(D - \int \Delta D)$ becomes equal to or less than the predetermined distance value $l_{ref}$, the arrow symbol serving as the distance indicator segment blinks at a step 950. Thereafter, the vehicle direction of travel is read out at a step 960. The read direction of travel is compared with the update direction $\theta_r$ at a step 970. If the direction of travel does not match the update direction, a step 980 checks to see if the vehicle is within the fixed-radius update zone B. If the vehicle is still within the fixed-radius update zone, then control returns to the step 960; otherwise control returns to the step 370. On the other hand, if the direction of travel matches the update direction when checked at the step 970, the map display on the display screen 37 is normalized at a step 1045. Then, control passes to the step 480 of FIG. 4.

If the error rate δ is greater than the reference value δ when checked at the step 920, then the distance d between the vehicle position (x, y) and the update point ($x_1$, $y_1$) is calculated at a step 990. At a step 1000, the distance indicator segments are turned OFF one-by-one for each given unit of vehicle travel. Then, the distance d derived at the step 990 is compared with the predetermined distance value $l_{ref}$, at a step 1010. If the distance d is equal to or less than the predetermined distance value $l_{ref}$, the arrow symbol blinks at a step 1020. Otherwise, the update direction $θ_r$ is read out at a step 1030. The vehicle direction is compared with the updating direction in a step 1040, which is identical to step 970 except that control passes to step 1050 if the two directions do not match. Similarly, step 1050 is identical to step 980 except that control returns to step 990 if the vehicle is still within the fixed-radius update zone B.

In the preferred embodiment, after the step 370, a routine shown in FIG. 22 is triggered to guide the vehicle back to the preset route. The routine of FIG. 22 first displays the preset route on the map at a step 1102. Thereafter, the update point through which the vehicle last passed before going off course is highlighted on the display at a step 1104. The symbol of the vehicle position will be simultaneously displayed on the display screen 37. Presumably, the vehicle is than driven back to the preset route. During this travel, the number of known target points through which the vehicle passes on the way back to the preset route is counted. This count N of target points is compared with a given value, e.g. 11, at a step 1106. If the count N is equal to or greater than the given value, control passes to a step 1108 in which the message "OFF COURSE, PLEASE REENTER CURRENT POSITION" is displayed to request reentry of the current vehicle position data, in the manner shown in FIG. 21. Then, the navigation program returns to the step 102.

On the other hand, as long as fewer than 11 target points have been passed, control passes to a step 1110. At step 1110, the distance from the current vehicle position to the last update point is checked. Once the vehicle approaches to within 200 m of the update point, for example, then normal navigation can resume from step 1112.

Figure 25:
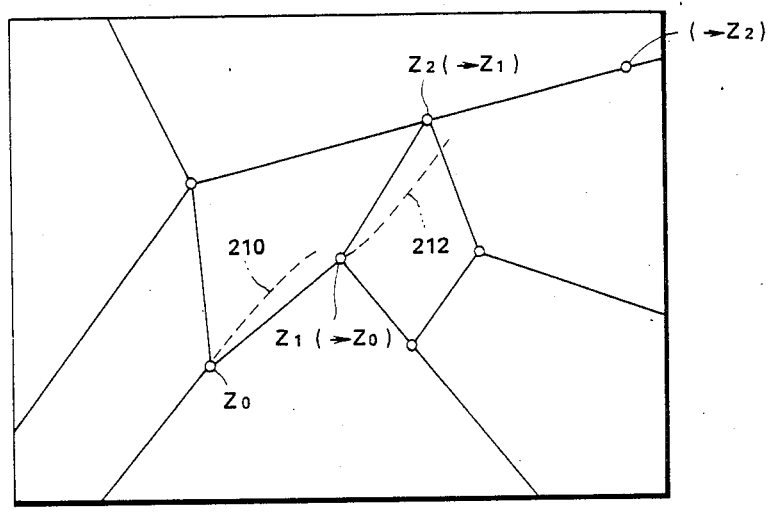
FIG. 25 is a diagram showing typical updates of the vehicle symbol on the display.
Figure 26:
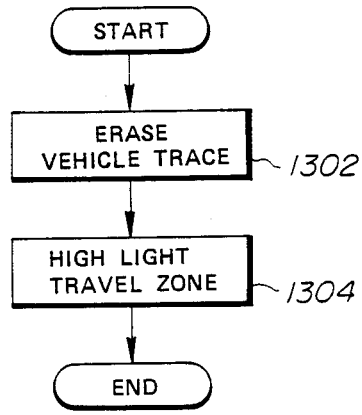
FIG. 26 is a flowchart of a program for updating the display.

FIGS. 24 to 26 show another embodiment of the navigation process to be implemented by the preferred navigation system. The process of guiding the vehicle to the navigation start point can be substantially the same as in the previous embodiments. Alternatively, navigation process can be triggered by depressing a START switch in the key-switch array 41 of the input unit 29. Then, the navigation start position is recognized to be the instantaneous position when the START switch is depressed at a step 1202 in FIG. 24. This is used to set up the first travel zone at a step 1204. Then, the road map display starts at a step 1206. A trace of the vehicle position since the last update point is superimposed on the displayed map at a step 1208. The current vehicle position is monitored in substantially the same way as disclosed with respect to the previous embodiments. Step 1210 checks to see if the vehicle has reached the update zone. If not, control returns to step 1206. Otherwise, the program moves to the larger-scale map display in step 1212 and then executes one of the subroutines of FIGS. 20 and 21, in a step 1213. Thereafter, once the vehicle reaches the update point, the vehicle position trace is redrawn between the two update points at a step 1214. The subsequent step 1216 checks to see if that update point was the navigation end point. If not, the travel zone is renewed by taking the second update point in the preceding travel zone as the new first update point at a step 1218.

As shown in FIG. 25, when moving to a new travel zone, the travel distance data $\int \Delta D$ is reset to zero or a given value e.g. 0.03D. At the same time, the vehicle trace on the display screen 37 is cleared and restarted from the update point $Z_1$. Thus, the vehicle position trace always starts from the first update zone of the current travel zone and is redrawn each time the vehicle reaches the second update point of the current travel zone.

FIG. 26, shows the step 1214, in which the vehicle trace is redrawn on the display screen 37, in more detail. First, at a step 1302, the vehicle trace through the former travel zone is erased. Thereafter, the route from $Z_0$ to $Z_1$, i.e. the former travel zone, is highlighted as the vehicle trace through the former travel zone.

Therefore, the vehicle position and route can be accurately shown despite errors in measurements of the travel distance and travel direction.

Therefore, the present invention fulfills all of the objects and advantages sought therefor.

We claim:

1. A navigation system for an automotive vehicle comprising:
   first means for monitoring vehicle motion and deriving first data indicative of vehicle travelling data;
   second means for storing a map which is separated into a plurality of blocks and includes a plurality of known points;
   third means for entry of position data of at least a start point and a destination;
   fourth means operable for selection of a route for the vehicle and storing the selected route, said fourth means storing second data indicative of a navigation start point, a navigation end point, designated known points along said route and between said navigation start point and said navigation end point, and a predetermined condition for detecting when the vehicle reaches each of said designated known points, said fourth means determining one of the known points closest to the start point as said navigation start point and another of the known points closest to the destination as said navigation end point by searching said known points within a search area which is expandable in a limited direction determined based on a direction of a straight line extending through the start point and the destination;
   fifth means for displaying said map stored in said second means, and a symbol representing a vehicle position; and
   sixth means for setting a travel zone between successive designated known points and displaying instantaneous position of said vehicle, said sixth means further operable for:
   monitoring said vehicle position within said travel zone;
   detecting when said predetermined condition is satisfied; and,
   in such cases, setting a successive travel zone.

2. A navigation system as set forth in claim 1, wherein said fourth means determines said limited expanding direction of said search area by dividing a coordinate system into a plurality of sectors and selecting one of said sectors including said direction along which said straight line lies.

3. A navigation system as set forth in claim 2, wherein said fourth means expands said search area in an iterative fashion whenever no known point is found in said search area.

4. A navigation system as set forth in claim 3, wherein said sixth means detects the approach of the vehicle to a next designated known point on the basis of said first data, detects when the distance from the vehicle position to said next designated known point is less than a given distance, thus defining an area centered at said next designated known point, detects when the vehicle enters said defined area and checks said second data against a given direction so as to detect when vehicle travel direction matches said given direction, thereby detecting when said predetermined condition is satisfied, and that the vehicle has reached said next designated known point.

5. A navigation system as set forth in claim 3, wherein said sixth means derives a distance of travel from a starting designated known point, detects the approach of the vehicle to a next designated known point on the basis of said first data, and detects when the distance from the vehicle position to said next designated known point is less than a given distance, thereby defining an area centered at said next designated known point, detects when the vehicle enters said defined area and compares said derived travel distance with a known distance between said designated known points, thereby detecting when said predetermined condition is satisfied, and thereby detecting that the vehicle has reached said next designated known point.

6. A nagivation system as set forth in claim 3, wherein said fourth means stores data indicative of the vehicle travel direction while approaching a next designated known point and the vehicle travel direction leaving said next designated known point, and derives said direction data so as to represent a direction intermediate said stored directions.

7. A navigation system as set forth in claim 4, wherein said first means replaces said first data indicative of vehicle position with position data for said next designated known point when said sixth means detects that the vehicle has reached said next designated known point.

8. A navigation system as set forth in claim 5, wherein said first means replaces said first data indicative of vehicle position with position data for said next designated known point when said sixth means detects that the vehicle has reached said next designated known point.

9. A navigation system as set forth in claim 8, wherein said first means replaces said first data with the position data of said next designated known point when the travel distance derived by said sixth means matches the known distance between the two designated points at least within said defined area, in cases where vehicle travel directions approaching and leaving said next designated known point are approximately equal.

10. A navigation system as set forth in claim 9, wherein said sixth means defines said defined area as a circular area of variable radius related to an error value when said approaching direction and leaving direction are different, and as an elongated area having a minor axis parallel to the vehicle travel direction, and a major axis perpendicular to said vehicle travel direction.

11. A navigation system as set forth in claim 10, wherein said first means replaces said first data with the position data of said next designated known point when the vehicle travel distance from a former designated known point is less than said known distance between said two designated known points when the vehicle exits a distal side of said elongated area.

12. A navigation system as set forth in claim 11, wherein said sixth means defines a new travel zone whenever said first data is replaced with the position data for said next designated known point.

13. A navigation system for an automotive vehicle comprising:
a map memory storing a road map which is divided into a plurality of pages further subdivided into contiguous blocks, said map memory also storing identification data for the blocks and index data for various points within the map blocks, which index data includes position data for a plurality of known points;
an input unit for entry of the identification data for a map memory block and the index data for known points;
a display unit for displaying on a display screen a map block based on said identification data;
a processor accepting entry of the index data for a travel starting point and a destination through the input unit, searching for the map blocks containing the designated known points based on said entered data, said processor progressively expanding the search area along a vector between the travel starting point and the destination, said processor finding the known point closest to the travel starting point and the other known point closest to the destination along the vector and storing these known points as the navigation start point and the navigation end point, and said processor further determining a route between said navigation start point and said navigation end point.

14. A process for navigation of a vehicle along a preset route comprising the steps of:
providing a road map which is divided into a plurality of map blocks and including data for a plurality of known points on a map;
providing input data defining a start point and a destination;
displaying said road map on a visual display screen;
searching in a given search area for finding known points which are closest to said start point and said destination for designation as a navigation start point and a navigation end point, said given search area originally corresponding to an area of said map blocks including said start point and said destination and progressively expanding in a limited direction which is determined based on a direction between said start point and said destination;
presetting a route between said navigation start point and said navigation end point across said map and designating known points along the preset route;
defining a travel zone between a first starting designated known point and a second designated known point along said route;
monitoring vehicle travel distance within said travel zone and detecting when the vehicle approaches to within a first given area of said second designated known point;
displaying a symbol indicative of the instantaneous vehicle position through said travel zone;

monitoring vehicle travel within said first given area for comparison with a predetermined criterion for detecting when the vehicle coincides with said second designated known point;

shifting a vehicle position indicative symbol to said designated known point on the display; and redefining said travel zone by taking the second designated known point which currently coincides with said vehicle as said first designated known point and selecting a neighboring designated known point as said second designated known point.

15. The process as set forth in claim 14, which detects when the vehicle coincides with said first given area by monitoring vehicle driving direction and comparing said vehicle driving direction with a known direction.

16. The process as set forth in claim 15, wherein said known direction is derived from a known first vehicle travel direction assumed by a vehicle approaching said second designated known point and a known second vehicle travel direction assumed by a vehicle having said second designated known point.

17. The process as set forth in claim 16, wherein said known direction is the bisector of the angle subtended by the azimuth vectors of said known first and second directions of travel.

18. The process as set forth in claim 17, wherein vehicle coincidence with said second designated known point is detected by comparing said vehicle travel distance within said first given area with a known distance between said first and second designated known points and detecting when the travel distance matches said known distance.

19. The process as set forth in claim 18, wherein vehicle coincidence with said second designated known point is detected by monitoring vehicle position derived from said vehicle travel distance data and vehicle driving direction data and detecting when the vehicle reaches a distal border of said first given area.

20. The process as set forth in claim 19, wherein the position of the vehicle is updated with known position data of said second designated known point each time said travel zone is redefined.

21. A method of finding a connected path, in a feld of points of known positions, between designated start and end points, comprising the steps of storing the points of known position in a memory, and:

(a) tesselating said field into a plurality of blocks;
(b) sectoring said field about said start point;
(c) identifying a target sector in which lies a straight-line vector from said start point to said end point;
(d) defining a search area, initially enclosing only the block in which said start point lies;
(e) checking said search area for the presence of at least one of said points of known positions;
(f) if none of said points of known position is found in step (e), expanding said search area to include blocks adjoining blocks already in said search area and lying at least in part within said target sector;
(g) repeating steps (e) and (f) until at least one of said points is found in step (e);
(h) defining the point found in step (a) as said start point;
(i) repeating steps (d) through (g) in the order listed to determine said end point; and
(j) electronically generating said connected path based on the start and end points found in steps (h) and (i).

22. The method of claim 21, wherein the step (h) further comprises the steps of finding which of the points found in step (e) lies closest to said start point, in cases where more than one point is found in step (e).

23. The method of claim 21 wherein said generating step comprises generating a display of at least one search area including therein a display of a position of a vehicle travelling between said start and end points.

* * * * *